O. M. LEICH.
CURRENT INTERRUPTING DEVICE.
APPLICATION FILED JUNE 19, 1908.
964,169.
Patented July 12, 1910.
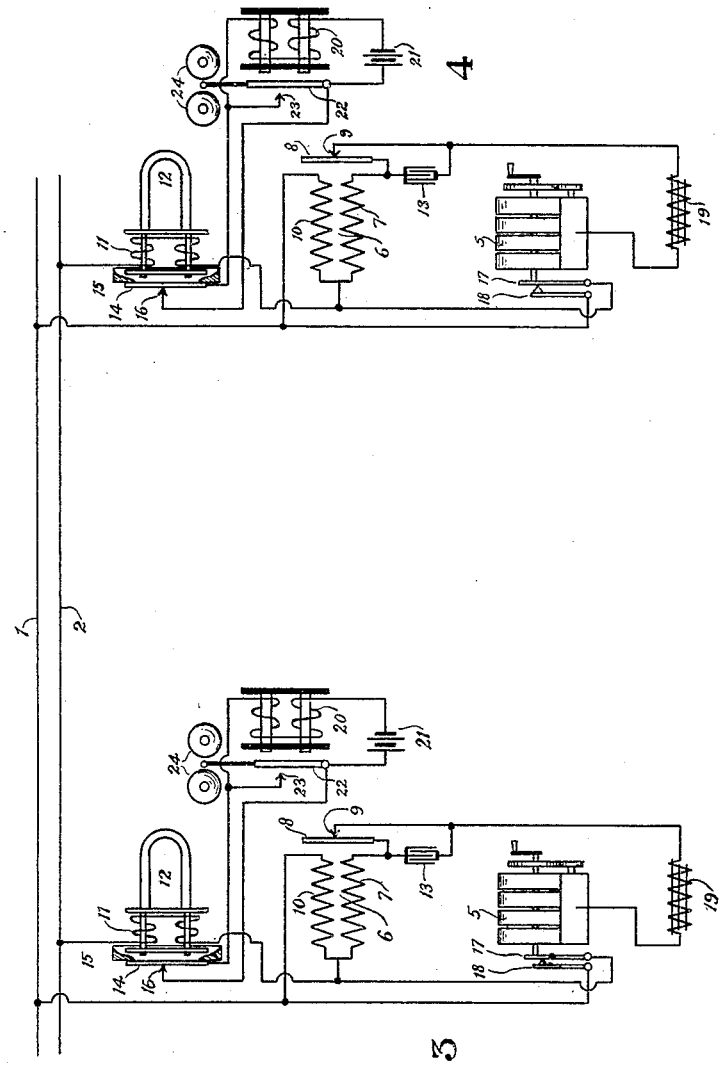
WITNESSES:
J.C.A. Anderson
Louis G. Berg
INVENTOR.
OSCAR M. LEICH
BY
ATTORNEY.

UNITED STATES PATENT OFFICE.

OSCAR M. LEICH, OF GENOA, ILLINOIS, ASSIGNOR TO CRACRAFT-LEICH ELECTRIC CO., OF GENOA, ILLINOIS.

CURRENT-INTERRUPTING DEVICE.

964,169.  Specification of Letters Patent.  Patented July 12, 1910.

Application filed June 19, 1908. Serial No. 439,311.

*To all whom it may concern:*

Be it known that I, OSCAR M. LEICH, a citizen of the United States, residing at Genoa, in the county of Dekalb and State of Illinois, have invented a certain new and useful Improvement in Current-Interrupting Devices, of which the following is a full, clear, concise, and exact description, reference being had to the accompanying drawing, forming a part of the specification.

My invention relates to current interrupting devices, and more particularly to current interrupting as used in connection with signal transmission systems, although my invention is applicable also to other systems.

In signal transmission work it is frequently advisable to obtain a reasonably high frequency of current without using primary batteries, and my invention contemplates the provision of an improved system whereby the use of such batteries may be eliminated in obtaining currents of high frequency capable of use in signal transmission and for other purposes.

I will explain my invention more in detail by reference to the accompanying drawing, which shows my invention as applied to a signal transmission system. In this drawing I show two line wires, 1 and 2, as connecting respectively two signal receiving and transmission stations, 3 and 4. It is desired to transmit a signal from station 3 to station 4, and vice versa. The objectionable features of vibrating ringers make it impossible to use them for any long distance signal transmission, and my invention provides means to transmit such signals without the use of such vibrating bells, being connected directly to the line wires.

It is inadvisable to use dry batteries for the transmission of signals if in their place can be substituted a generating apparatus of more substantial character, and to provide such a generating apparatus I utilize a magneto generator 5. The frequency of this magneto generator as commercially constructed, would not be high enough to effect a satisfactory transmission of the signal, and my invention contemplates the interposition of an induction coil 6, between the generator 5, and the line wires 1 and 2. The induction coil 6, has a primary 7, connected in bridge of the generator 5, through a make and break contact comprising an armature 8, and the back contact 9. When the generator 5, is actuated, current is furnished the primary winding 7, which attracts the armature 8, and breaks circuit with the back contact 9. This induces a current in the secondary winding 10, of the induction coil 6. This secondary winding 10, is connected in bridge of the line wires 1 and 2, and preferably in series with a winding 11, of an electromagnetic device 12. It will be seen that although the frequency of the generator 5, will be about 30 cycles per second, a higher frequency is imposed by the secondary winding upon the line wires 1 and 2, as the spring armature 8, depending upon its elasticity, is designed to make a great many contacts during the time of one complete cycle as furnished by the generator 5.

I provide a condenser 13, around the armature 8, and its back contact 9, which takes care of the discharge current. The electromagnetic device 12, is provided with an armature 14, which is preferably supported throughout its entire periphery by means of the supporting ring 15. This armature, or diaphragm 14, is therefore in the nature of a diaphragm of a telephone receiver, and is contracted and drawn away from its back contact 16, when the frequency is sufficiently high to keep the diaphragm 14 uninterruptedly drawn toward the pole pieces of said electromagnetic device 12. From this it will be apparent that whenever the generator 5, is actuated high frequency currents are generated in the secondary winding 10, which actuate the diaphragms 14 of the various electromagnetic devices, thereby opening the circuit between said diaphragms and their back contacts 16.

The generator is connected to one side of the primary winding 7, by means of the shunt spring 17. The shunt spring 17, is in closed circuit with a shunt spring 18, when a generator is not being actuated. The closure of circuit between the shunt springs 17 and 18, when the generator is not operating practically eliminates the secondary winding 10, from circuit with the winding 11, so that winding 11, receives its full share of current from the line wires 1 and 2, without the extra resistance which would be offered, were the secondary winding 10, to remain in circuit.

I provide an impedance coil 19, in series with the generator between said generator and the primary winding 7, of the induction coil 6. The preferred way in which an audible signal is occasioned at any sub-station when the diaphragm 14, is drawn away from its back contact 16, is in providing a vibrating bell consisting of the winding 20, mounted on a special core, which is in series with a battery 21, and the back contact 16, and the diaphragm 14. Thus the armature 22, of the vibrating bell is permanently drawn against the pole pieces provided for the winding 20. The diaphragm 14 and the back contact 16, are likewise as shown connected in shunt of the armature 22 and its back contact 23. Now when circuit between diaphragm 14 and its back contact 16, is broken, the vibrating bell comprising the armature 22, back contact 23, and winding 20, operates in connecting with battery 21 to cause the armature 22 to vibrate, thus actuating the gongs 24—24. From this it will be seen that when a current of sufficiently high frequency is generated, the armature 14 is withdrawn from its contact 16, and by its rapid vibrations maintains what is for the purposes of the signal winding 20 and its armature practically an open circuit, thus allowing battery 21 to ring the bell in the usual way. It will thus been seen that no primary batteries are necessary to cause a signal to be transmitted over a large distance by means of vibrating bells; and furthermore the vibrating bells are not in the main circuit. The generator 5, offers a permanent supply of current to cause fluctuations in the primary winding to the induction coil, through the agency of the armature 8, and its associated back contact.

By virtue of my invention the frequency of the generator 5, is largely increased, thus permitting a signal to be transmitted capable of operating the devices responsive to the higher frequency.

While I have herein shown and particularly described the preferred embodiment of my invention, I do not limit myself to the precise construction and arrangement, as herein set forth, but

Having thus described my invention, what I claim as new and desire to secure by Letters Patent is:

1. A current modifier, comprising a fluctuating current generator, an induction coil having a primary winding, a secondary winding, a contact breaking device, an armature for controlling the contact-breaking device, said armature being under the inductive influence of both windings, and said generator, primary winding and contact breaking device constituting a serial metallic circuit, said secondary winding being adapted for connection to a transmission circuit, means controlled by said generator for short-circuiting said secondary winding when said generator is not operating, and a condenser around the contact breaking device.

2. A current modifier comprising a fluctuating current generator, an induction coil having a primary winding, a secondary winding, a contact breaking device, having a spring whose rate of vibration has a higher frequency than that of the current furnished by the generator, an armature for controlling the contact breaking device, said armature being under the inductive influence of both windings, and said generator, primary winding and contact breaking device constituting a serial metallic circuit, said secondary winding being adapted for connection to a transmission circuit, means controlled by said generator for short-circuiting said secondary winding when said generator is not operating, and a condenser around the contact breaking device.

In witness whereof, I hereunto subscribe my name this 15th day of May 1908.

OSCAR M. LEICH.

Witnesses:
NIELS PEDERSEN,
ALEX. C. REID.